United States Patent Office 3,011,980
Patented Dec. 5, 1961

3,011,980
ACTIVATED BAUXITE AND CATALYST CONTAINING SAME
Norman Bell, Walnut Creek, Calif., assignor to Kaiser Aluminum & Chemical Corporation, Oakland, Calif., a corporation of Delaware
No Drawing. Filed Feb. 3, 1959, Ser. No. 790,800
14 Claims. (Cl. 252—464)

This invention relates to the preparation of an activated material containing alumina and more particularly to an activated bauxite of improved properties.

The use of activated bauxite as an adsorbing material is well known. For example, in many chemical processes, activated bauxite is used to remove water in liquid or vapor form from gases, vapors and liquids. This is usually accomplished, for example, in commercial installations by placing the activated bauxite material in towers and columns and passing the water-containing gases therethrough. Aside from the drying of gases, other uses of activated bauxite include decolorization of petroleum hydrocarbons, as catalysts, etc.

The activation of bauxite, heretofore, involves the grinding and screening of the mined bauxite ore and heating the same to temperatures of the order of 500°–1600° F. The product is an irregular granular material of various sizes and shapes. Although the activated bauxite has satisfactory adsorptive properties, it possesses disadvantages in its irregular sizes and shapes. The granular material placed in a column or bed presents flat surfaces to the flow of gases therethrough and non-uniform flow paths for the gases are developed and increase the tendency of the material to pack and consolidate with resultant increases in pressure drops across the column or bed. Another disadvantage encountered due to the irregular shapes and sizes, is the lack of desired hardness as measured by resistance to breakage. Since the individual granules may contain jagged surfaces and pointed edges, attrition is greater and consequently the hardness of the material is less.

This invention provides for an improved activated bauxite material in the form of substantially uniform sized, substantially spherical nodules having high adsorption properties, improved crushing strengths, and low abrasion losses. The nodules of this invention are suitable for various uses, e.g., as adsorbents in columns or beds for drying of gases, vapors, etc. having low pressure drops; as a catalyst per se or as a component of a catalyst mixture, etc.

According to the present invention, activated bauxite in the form of novel substantially uniform sized and substantially spherical nodules can be produced by the following steps. Bauxite ore is processed through suitable equipment to remove limestone rocks and other extraneous matter, and to reduce the size of the ore. The bauxite is dried to a low moisture content (i.e., about 1–8%), and ground to a fine mesh size, e.g. 90–99% minus 325 mesh. It is important that the grinding step produce bauxite particles that are substantially uniform in size. The ground bauxite is fed to a flame calciner comprising a metal pipe or tube with a natural gas burner at one end which can produce a flame within the tube. The bauxite is fed into the flame or ahead of it and is blown through, either all or a part of the pipe. The product from the calciner has a loss on ignition (referred to hereinafter in the instant specification as L.O.I.) at 1000° C. of about 3–8%. The calcined bauxite is then fed to a suitable nodulizer wherein it is nodulized with water (about 50% by weight of the bauxite). The nodules formed in the nodulizer are cured by aging for at least eight hours to allow rehydration with no external heat being required. The cured nodules are activated in a moving-bed column by the passage of 500–1000° F. air through the bed. The product is screened, cooled, and ready for use. The activated product nodules have an L.O.I. at 1000° C. of about 3–9%, high porosity, a large surface area, good adsorption characteristics, and good resistance to crushing and abrasion. The product nodules are suitable among other uses as adsorbents, catalysts per se, as a component of catalyst mixtures useful in various chemical processes such as oxidation, dehydration, and desulfurizing reactions, etc.

Any bauxite ore may be used for the preparation of the activated bauxite heretofore described. For example, the bauxites obtained from Surinam, French Guiana, and Arkansas are suitable. The Jamaican bauxites are preferable, since it is not a rock-like material and Table I shows a typical analysis of a Jamaican bauxite ore:

TABLE I
*Jamaican bauxite (dry basis)*

| | |
|---|---|
| Appearance | Reddish brown |
| Bulk density, lb. per cu. ft | 62.45 |
| Analysis, percent: | |
| $Al_2O_3$ | 48.07 |
| $Cr_2O_3$ | 0.50 |
| $SiO_2$ | 2.36 |
| $TiO_2$ | 2.46 |
| $Fe_2O_3$ | 21.87 |
| $P_2O_5$ | 0.49 |
| Loss on ignition | 23.68 |
| CaO, MnO, $V_2O_5$, miscellaneous | 0.57 |
| | 100.00 |

The bauxite ore from the mine is initially crushed, if necessary, and limestone and extraneous material removed. A drying step to a low moisture content of about 1–8% is required prior to the grinding step. The drying is accomplished in separate suitable drying equipment or it may be dried simultaneously during the grinding step in a grinding mill provided with drying means. The bauxite is ground to a particular fine mesh size which is important in the subsequent flame calcining and nodulizing steps. The grinding step can be performed, for example, in a Raymond Imp Mill or any other suitable grinding apparatus. The bauxite is preferably ground to contain not more than about 10%, 12 microns in particle size. It is desirable to approach 100% in the 12 micron size. Preferably and as a practical matter, it is ground to obtain about 90–99%, −325 mesh size. However, the practical upper limit of particle size is on the order of about 80%, −325 mesh.

Irrespective of the bauxite used for the preparation of the activated bauxite spherical nodules, it is important that it be ground to a narrow range of particle sizes, i.e., the greater portion of the ground particles should be substantially within the size range specified.

A particularly important aspect in the production of the activated bauxite is the flame calcination step. A flame calciner comprising a tube or pipe with a natural gas or propane gas burner at one end is preferable. An air-gas flame of suitable length burns within a portion of the tube. The ground bauxite is fed through an opening in the tube so that it passes near the flame or through the tip or last six or eight inches of the flame. The bauxite and gases from the tube are separated in a cyclone. The combustion conditions in the flame calciner are adjusted to give a calciner product having an L.O.I. of about 3–8% at 1000° C.

The calcined bauxite product from the flame calciner is nodulized in any suitable type of nodulizer. A particularly suitable nodulizer comprises a pan about three feet in diameter and about 18 inches deep. The pan is rotated at a predetermined speed and tilted at about 20–45° to the horizontal. Water is added to the calcined bauxite for the nodulizing operation. The water, usually in amounts of about 50% by weight of the bauxite, is added to the ground bauxite as a spray in the nodulizer or the bauxite and water may be premixed prior to addition to the nodulizer. The sizes of the nodules will depend upon the nodulizing conditions, such as the residence time in the nodulizer, the speed of pan rotation, rate of feed, etc. Uniform size activated bauxite nodules can be produced varying in size from about $1/16$ of an inch to two inches in diameter. Larger nodule sizes are also possible, if desired, by adjusting the nodulizing operations.

The formed nodules from the nodulizer are cured by aging to harden them prior to the final step of activation. It is believed that the nodules from the nodulizer contain a transitional form of alumina, in particular the eta form, which contains slightly less than about 2% $H_2O$. The curing step involves a rehydration of the transitional form of alumina in the nodules to a more fully developed crystalline form believed to be bayerite of undetermined content. The curing is preferably accomplished by allowing the wet nodules from the nodulizer to remain in sealed storage containers for at least about eight hours at temperatures of about 77° C. or higher. However, curing can also be accomplished by using lower temperatures, such as ambient temperature, longer periods of time, and using unsealed storage containers. The above discussion on the theory of the curing step is presented merely as an attempt to explain the transformations of the alumina in the bauxite that take place during the treatment of the bauxite and is not intended to be limiting in any sense.

The cured nodules are activated in the final step of the process in a moving-bed column by the passage of air at a temperature of 500–1000° F. through the bed to obtain product activated bauxite nodules which have an L.O.I. of about 3–9%, at 1000° C.

The activated bauxite product comprises spherical nodules of substantially uniform size. The product is a material of improved quality having a large surface area, increased crushing strength, and good absorption characteristics. It is believed that eta alumina is present in the product. Furthermore, it is believed that the $Fe_2O_3$ present in the material has become activated to some degree. The composition of the activated bauxite product of this invention with respect to the forms of alumina present is not presently established and therefore the reasons for its improved qualities are not fully known. However, the production of the improved product is possible by following the process steps and conditions outlined herein.

EXAMPLE I

A damp Jamaican bauxite, from which limestone and extraneous material have been removed, containing about 16% free (uncombined) water, was passed through a Raymond Imp Mill provided with heating facilities. The bauxite was dried therein with gases of inlet temperatures of about 700° F. to a free water content of 1% and ground to a particle size of 99%, −325 mesh. The mill product was collected and fed through a screw feeder which allowed it to drop into a flame calciner (as described above) and then into the flame at a point approximately four inches from the tip. A natural gas-air flame with approximately 10% excess air was used, and combustion controlled to give a temperature of 1900–2000° F. at a point about 6 inches in front of the tip of the flame. The calcined product was transported to a dust collecting system. The calcined product at this point had an L.O.I. at 1000° C. of approximately 4%, and was fed to a standard pan-type nodulizer where it was sprayed with water (about 50% by weight of the bauxite) and rolled into substantially spherical nodules in sizes ranging between $1/8$ and $1/4$ inch in diameter. The wet nodules were collected and placed in a sealed container and allowed to cure for eight hours without any external heating. Rehydration took place during the curing time. The cured nodules were then fed to an activated column through which 900° F. air was passed. The residence time in the column was approximately one hour and 15 minutes. The product activated bauxite nodules had analyses and properties shown in Table II.

TABLE II

Chemical analyses:
| | | |
|---|---|---|
| $SiO_2$ | percent | 3.0 |
| $Fe_2O_3$ | do | 27.6 |
| $TiO_2$ | do | 3.1 |
| $Na_2O$ | do | 0.05 |
| $Al_2O_3$ | do | 60.7 |
| $Cr_2O_3$, $P_2O_5$, CaO, MnO, $V_2O_5$, misc. | do | 1.85 |
| Loss on ignition | do | 3.7 |

Physical properties:
| | | |
|---|---|---|
| Static adsorption at 60% relative humidity | do | 9.0 |
| Surface area | m.²gm | 150 |
| Specific pore volume | ml./gm | 0.40 |
| Average pore diameter | A | 105 |
| True density | gm./ml | 3.55 |
| Bulk density— | | |
| Loose | lb./ft.³ | 50 |
| Packed | lb./ft.³ | 54 |
| Crushing strength ($1/4$″ x 8 mesh) | percent | 97 |
| Abrasion loss | do | 0.2 |

The crushing strength of the activated bauxite was 97% denoting that the nodules had a high degree of resistance to crushing. The resistance to crushing or the crushing strength is determined by a standard test in the industry which comprises subjecting 120 ml. of $1/4$ inch to 8 mesh material to a pressure of 1000 p.s.i. in a cylinder $1 3/4$ inches in diameter, and determining the percentage of the product surviving in particles greater than the 8-mesh size. This number or figure may be considered as the crushing strength of the material.

The abrasion loss of the material produced in the example was 0.2%. The resistance to abrasion or the abrasion loss may be determined by another standard test which comprises placing 160 grams of the $1/4$ inch to 8 mesh material on a 28 mesh screen and shaking for 30 minutes on a Rotap. The percentage of fines passing the 28 mesh screen may be considered as abrasion loss of the material.

Crushing strengths and abrasion losses are important considerations in commercial applications of the activated bauxite materials, wherein it is subjected to the weight of the material in high bed depths and abrasion during handling and shipping, filling of the bed, and mechanical grinding (movement) during fluid flow through the bed. The activated bauxite nodules of this invention have excellent crushing strengths ranging up to 98% and low abrasion losses. These excellent qualities prevent appreciable amounts of undesired dust from being present in the material.

Table III shows a comparison of crushing strength and abrasion loss of the activated bauxite produced in the Example 1 with four different commercially available activated bauxites. The four commercially available activated bauxites are designated as A, B, C, and D, and are granular materials ranging in size from $1/4$ inch to 8 mesh and of alumina contents ranging up to about 85%.

TABLE III

| Sample | Crushing Strength, percent | Abrasion Loss, percent |
| --- | --- | --- |
| A | 45.0 | 4.44 |
| B | 63.3 | 5.26 |
| C | 58.3 | 3.87 |
| D | 55.0 | 4.18 |
| Product of Example 1 | 97.0 | 0.2 |

The graph in Table IV shows the comparative resistance to air flow between a granular material A and the spherical nodules B of this invention. The material A consisted of irregular, granular particles. The material B consisted of a substantially spherical nodular material produced by this invention. Both materials were in the ¼ inch +8 mesh size range. The pressure drops were measured with air at room temperature flowing through a 2¾ inch inner diameter column and one atmosphere of pressure at the discharge. It is readily seen that the material produced by this invention has a substantially lower resistance to air flow than the granular material. The substantially lower resistance to air flow of the activated bauxite nodules is a result of the substantially uniform size and substantially spherical shape of the nodules. Furthermore, due to their high crushing strengths and low abrasion losses, there is a minimum of dust or irregular particles formed in a bed or column which could cause the material to pack and consolidate resulting in non-uniform gas flows and increases in pressure drops.

TABLE IV

*Comparative resistance to air flow between granular and nodular materials*

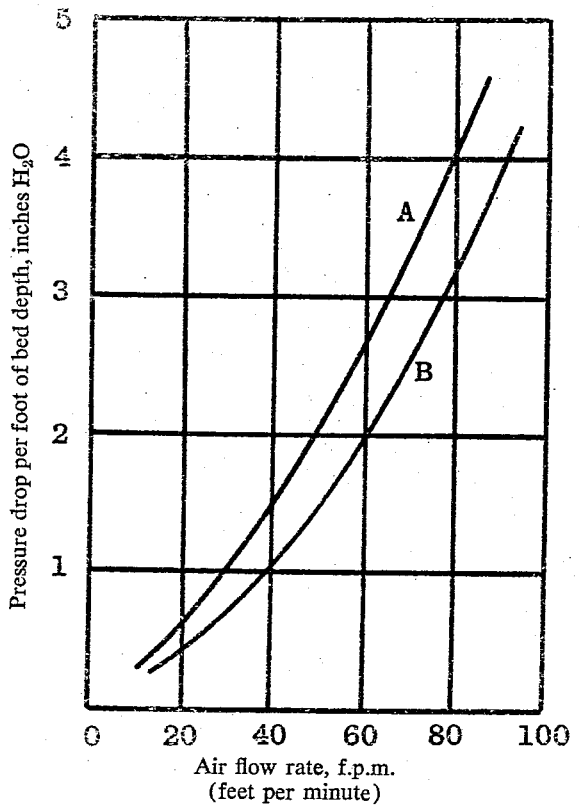

The adsorption capacities of the products of this invention are considered excellent. Static adsorption tests at 60% relative humidity have been conducted which showed adsorption capacities at equilibrium of from 9–15% moisture adsorbed (on the basis of the weight of the active bauxite).

The activated bauxite nodules have a long life and are very heat stable. After being saturated with moisture, they may be readily reactivated by controlled heating, i.e., by passing gases at temperatures of 300–600° F. through a bed of the nodules. Repeated reactivation has no effect on the properties and efficiency of the nodules.

The activated bauxite of this invention in the form of substantially spherical nodules and possessing large surface area and good porosity is a suitable base for catalysts or can be used as a catalyst per se or as an adsorbent as desired, where the high quality of activated aluminas is not demanded or an inexpensive material is desired.

As an adsorbent it is useful in the dehydration of gases and liquids, for example, air, natural gas, hydrogen, carbon dioxide, oxygen, nitrogen, chlorine, ethylene, butane, and many aliphatic and aromatic hydrocarbons.

As a catalyst, per se, it is useful in certain dehydrogenation, desulfurization, reforming and oxidation reactions.

Catalytic materials known to promote certain desired reactions may be deposited on the activated bauxite nodules. Examples are $SiO_2$, $ZrO_2$, $Cr_2O_3$, $MoO_3$, $V_2O_5$, alkali metal oxides such as $K_2O$, etc. Mixtures of various oxides may also be used. The nodules are impregnated with the catalytic materials by procedures well known to those skilled in the art. The following examples are several typical catalytic materials that may be prepared using the activated nodules of this invention.

EXAMPLE 2

Activated bauxite nodules prepared in Example 1 were slurried in a 7% aqueous ammonium vanadate solution at a temperature of about 100° F. The mixture was stirred for 15 to 20 minutes. The nodules were separated from the solution and dried in a stream of air at a temperature of 250° F. The resultant dried catalytic material comprised $V_2O_5$ impregnated on the activated bauxite nodules. The catalyst has application in oxidation reactions such as the oxidation of unburned hydrocarbons in a gaseous mixture.

EXAMPLE 3

100 grams of activated bauxite nodules prepared in Example 1 were slurried in an aqueous solution of cobalt nitrate and ammonium molybdate at 100° F. to provide 1 part cobalt nitrate and 6 parts ammonium molybdate for 100 parts $Al_2O_3$. The mixture was stirred for 15 to 20 minutes and the nodules separated from the solution. The nodules were dried in a stream of air at temperatures sufficient to convert the molybdate and cobalt to the oxides. The catalyst produced is useful in certain desulfurization reactions.

EXAMPLE 4

Activated bauxite nodules prepared in Example 1 were slurried in a 5% aqueous solution of potassium carbonate at 100° F. The mixture was stirred for 15 to 20 minutes and the nodules separated from the solution. The nodules were dried in a stream of air at temperatures sufficient to convert the potassium carbonate to potassium oxide. The catalyst produced is useful in certain dehydrogenation reactions.

EXAMPLE 5

Activated bauxite nodules prepared in Example 1 were slurried in a 2% aqueous solution of $SnCl_4$ at 100° F. The mixture was stirred for 15 to 20 minutes and the nodules separated from the solution. The nodules were dried in a stream of air at temperatures sufficient to convert the $SnCl_4$ to the tin oxide. The catalyst produced is useful in the cracking of hydrocarbon oils.

The activated bauxite nodules of this invention also have application in decolorization processes such as decoloring petroleum hydrocarbons and certain chromatographic processes wherein, for example, one gas may be adsorbed from a mixture of gases.

All mesh sizes referred to herein are the Tyler standard sieve series.

What is claimed is:
1. Activated bauxite in the form of substantially spher- ical nodules prepared by a process comprising heating and grinding bauxite ore to a low free-water content and to a narrow range of relatively fine particle sizes, flame calcining said ground particles of bauxite to a low degree of loss on ignition, nodulizing said calcined particles with water to form substantially spherical nodules, curing said nodules by aging for a sufficient period of time to allow rehydration to take place, and heat activating said cured nodules.

2. Activated bauxite in the form of substantially spherical nodules prepared by a process comprising heating and grinding bauxite ore to a free-water content of about 1–8% and to a narrow range of relatively fine particle sizes of at least about 80%, −325 mesh, flame calcining said ground particles of bauxite to a loss on ignition at 1000° C. of about 3–8%, nodulizing said calcined particles with water to form substantially spherical nodules, curing said nodules by aging for at least about eight hours to allow rehydration to take place, and heat activating said cured nodules at temperatures of 500–1000° F. to a loss on ignition at 1000° C. of about 3–9%.

3. Activated bauxite in the form of substantially uniform sized, substantially spherical nodules prepared by a process comprising heating and grinding bauxite ore to a free water content of about 1% and to a particle size of about 99%, −325 mesh, flame calcining said ground particles of bauxite to a loss on ignition at 1000° C. of about 3–8% by controlled feeding of said particles into a gas-air flame having a temperature of about 1900–2000° F. at a point about 6 inches in front of the tip of the flame, nodulizing said calcined particles with about 50% by weight water to form substantially uniform sized, substantially spherical nodules, curing said nodules in sealed containers by aging for about eight hours to allow rehydration to take place, and heat activating said cured nodules at temperatures of about 900° F. to a loss on ignition at 1000° C. of about 4%.

4. A catalyst composition comprising a catalytically active material supported on substantially spherical nodules of activated bauxite, said nodules prepared by a process comprising heating and grinding bauxite ore to a low free-water content and to a narrow range of relatively fine particle sizes, flame calcining said ground particles to a low degree of loss on ignition, nodulizing said calcined particles with water to form substantially spherical nodules, curing said nodules by aging for a sufficient period of time to allow rehydration to take place, and heat activating said cured nodules.

5. The catalyst composition of claim 4 wherein said catalytically active material is a metal oxide desulfurization catalyst.

6. The catalyst composition of claim 4 wherein said catalytically active material is a metal oxide dehydrogenation catalyst.

7. The catalyst composition of claim 4 wherein said catalytically active material is a metal oxide oxidation catalyst.

8. The catalyst composition of claim 4 wherein said catalytically active material is a metal oxide cracking catalyst.

9. The catalyst composition of claim 5 wherein said metal oxide is a mixture of molybdenum and cobalt oxides.

10. The catalyst composition of claim 6 wherein said metal oxide is $K_2O$.

11. The catalyst composition of claim 7 wherein said metal oxide is vanadium oxide.

12. The catalyst composition of claim 8 wherein said metal oxide is tin oxide.

13. A catalyst composition comprising a catalytically active material supported on substantially uniform-sized substantially spherical nodules of activated bauxite, said nodules prepared by a process comprising heating and grinding bauxite ore to a free-water content of about 1–8% and to a narrow range of relatively fine particle sizes of at least about 80%, −325 mesh, flame calcining said ground particles of bauxite to a loss on ignition at 1000° C. of about 3–8%, nodulizing said calcined particles with water to form substantially spherical nodules, curing said nodules by aging for at least about eight hours to allow rehydration to take place, and heat activating said cured nodules at temperatures of 500–1000° F. to a loss on ignition at 1000° C. of about 3–9%.

14. A catalyst composition comprising a catalytically active material supported on substantially uniform-sized substantially spherical nodules of activated bauxite, said nodules prepared by a process comprising heating and grinding bauxite ore to a free water content of about 1% and to a particle size of about 99%, −325 mesh, flame calcining said ground particles of bauxite to a loss on ignition at 1000° C. of about 3–8% by controlled feeding of said particles into a gas-air flame having a temperature of about 1900–2000° F. at a point about 6 inches in front of the tip of the flame, nodulizing said calcined particles with about 50% by weight water to form substantially uniform sized, substantially spherical nodules, curing said nodules in sealed containers by aging for about eight hours to allow rehydration to take place, and heat activating said cured nodules at temperatures of about 900° F. to a loss on ignition at 1000° C. of about 4%.

References Cited in the file of this patent

UNITED STATES PATENTS

| | | |
|---|---|---|
| 2,480,494 | Mathy | Aug. 30, 1949 |
| 2,495,278 | Nickels | Jan. 24, 1950 |
| 2,596,942 | Robertson | May 13, 1952 |

UNITED STATES PATENT OFFICE
CERTIFICATE OF CORRECTION

Patent No. 3,011,980 December 5, 1961

Norman Bell

It is hereby certified that error appears in the above numbered patent requiring correction and that the said Letters Patent should read as corrected below.

Column 4, line 13, for "activated" read -- activating --.

Signed and sealed this 1st day of May 1962.

(SEAL)
Attest:

ERNEST W. SWIDER
Attesting Officer

DAVID L. LADD
Commissioner of Patents